(12) United States Patent
Shrivastava et al.

(10) Patent No.: US 11,882,624 B2
(45) Date of Patent: Jan. 23, 2024

(54) METHOD AND SYSTEM FOR NOTIFYING RESOURCE CAPABILITY OF USER EQUIPMENT

(71) Applicant: Samsung Electronics Co., Ltd., Suwon-si (KR)

(72) Inventors: Vinay Kumar Shrivastava, Bangalore (IN); Ankit Srivastav, Bangalore (IN); Sarvesha Anegundi Ganapathi, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 66 days.

(21) Appl. No.: 17/526,736

(22) Filed: Nov. 15, 2021

(65) Prior Publication Data
US 2022/0078604 A1 Mar. 10, 2022

Related U.S. Application Data

(63) Continuation of application No. 16/791,151, filed on Feb. 14, 2020, now Pat. No. 11,178,536.

(30) Foreign Application Priority Data

Feb. 15, 2019 (IN) .............................. 201941006101
Feb. 12, 2020 (IN) .............................. 201941006101

(51) Int. Cl.
*H04W 8/22* (2009.01)
*H04W 4/06* (2009.01)
(Continued)

(52) U.S. Cl.
CPC .............. *H04W 8/22* (2013.01); *H04W 4/06* (2013.01); *H04W 76/40* (2018.02)

(58) Field of Classification Search
CPC ......... H04W 8/22; H04W 76/40; H04W 4/06; H04W 8/24; H04W 8/18
(Continued)

(56) References Cited

U.S. PATENT DOCUMENTS

2008/0102749 A1* 5/2008 Becker ................. H04L 12/189
455/3.06
2013/0094428 A1* 4/2013 Lee ..................... H04L 65/1066
370/312
(Continued)

FOREIGN PATENT DOCUMENTS

| CN | 101112020 A | 1/2008 |
|---|---|---|
| CN | 102231871 A | 11/2011 |
| CN | 102611993 A | 7/2012 |

OTHER PUBLICATIONS

Office Action dated Feb. 18, 2021 issued in corresponding U.S. Appl. No. 16/791,151.
(Continued)

*Primary Examiner* — Inder P Mehra
(74) *Attorney, Agent, or Firm* — Harness, Dickey & Pierce, P.L.C.

(57) ABSTRACT

The present disclosure describes method and system for notifying resource capability of user equipment. In accordance with the embodiments, the method includes determining an event related to one or more multimedia multicast-broadcast service (MBMS) service of interest to the UE in receive only mode (ROM) session when a system information related to MBMS is not broadcasted by a serving cell after transmission of an interest indication for MBMS service to the serving cell wherein the event indicates one of: (a) the UE is not interested in the one or more MBMS service through the ROM session; and (b) the UE is not in reception of the one or more MBMS service through the ROM session; and transmitting a ROM service interest
(Continued)

indication for the one or more MBMS service through the ROM session corresponding to the determined event to the serving cell.

20 Claims, 12 Drawing Sheets

(51) Int. Cl.
    *H04W 76/40*     (2018.01)
    *H04W 8/18*     (2009.01)

(58) Field of Classification Search
    USPC .......................................................... 370/312
    See application file for complete search history.

(56)                 References Cited

U.S. PATENT DOCUMENTS

| | | | |
|---|---|---|---|
| 2014/0078976 A1 | 3/2014 | Novak et al. | |
| 2018/0035242 A1* | 2/2018 | Yi | H04L 5/0037 |
| 2018/0167910 A1 | 6/2018 | Zeng | |
| 2019/0246244 A1* | 8/2019 | Rico Alvarino | H04W 4/06 |
| 2019/0380078 A1* | 12/2019 | Fujishiro | H04W 4/06 |

OTHER PUBLICATIONS

Notice of Allowance dated Jul. 13, 2021, issued in corresponding U.S. Appl. No. 16/791,151.
Chinese Office Action dated Jun. 13, 2022 for corresponding CN Patent Application No. 202010097040.8.

* cited by examiner

METHOD AND SYSTEM FOR NOTIFYING RESOURCE CAPABILITY OF USER EQUIPMENT

CROSS-REFERENCE TO RELATED APPLICATIONS

This is a continuation of U.S. application Ser. No. 16/791,151, filed Feb. 14, 2020, and claims priority under 35 U.S.C. § 120 to, Indian Provisional Patent Application No. 20194100610.1, filed Feb. 15, 2019 and Indian Patent Application No. 20194100610.1, filed Feb. 12, 2020 the entire contents of each of which are hereby incorporated by reference.

FIELD

The present disclosure generally relates to Multimedia Broadcast Multicast Service (MBMS). The present disclosure particularly relates to method and system for notifying baseband resource capability of user equipment.

BACKGROUND

The 3rd Generation Partnership Project (3GPP) provides for Multimedia Broadcast/Multicast Service (MBMS), which is a service of simultaneously transmitting a data packet to a plurality of users. The MBMS uses a shared channel so that a plurality of user equipment (UEs) efficiently receives data on one service. A base station allocates only one shared channel for data on one service, instead of allocating as many dedicated channels as the number of UEs to receive the service in one cell. The plurality of UEs simultaneously receives the shared channel, thus improving the efficiency of radio resources. A further development of MBMS is evolved Multimedia Broadcast Multicast Services (eMBMS) which provide MBMS over Long Term Evolution (LTE) networks at LTE speeds. Now MBMS services can be delivered in three modes, i.e., a broadcast mode, a multicast mode, and unicast mode. In the broadcast mode, each UE can receive the information within a service area on a unidirectional channel shared among the UEs. In the multicast mode, only the UE having a subscription to the MBMS service can receive the information on the unidirectional channel. In the unicast mode, the UE can receive and transmit data on dedicated bidirectional channels.

$5^{th}$ Generation (5G) broadcast mode Further evolved Multimedia Broadcast Multicast Service (FeMBMS) is a further development or enhancement of LTE broadcast evolved Multimedia Broadcast Multicast Services (eMBMS). The radio interface enhancements introduced under 3GPP Release 14/15 for FeMBMS include, dedicated broadcast transmission mode on a separate carrier with an Orthogonal Frequency-Division Multiplexing (OFDM) Cyclic Prefix (CP) length of up to 200 µs to support wide coverage areas (inter-site distance (ISD) upto 100 KM); flexible use of network capacity using up to 100% broadcast resource allocation for MBMS; shared eMBMS network for higher deployment flexibility; and new type of Multicast-broadcast single-frequency network (MBSFN) subframe without unicast control region to reduce overhead in dedicated broadcast transmissions. This enables broadcasters to transmit FeMBMS via existing High Tower, High Power (HTHP) infrastructure targeting widespread reach for TV services across masses (Free-to-Air, Free-to-View, Sub-scribed services). The system layer enhancements introduced under 3GPP Release 14/15 for FeMBMS include devices supporting Receive only Mode (ROM) session and devices supporting both MBMS and unicast with multiple receivers (Rx). ROM session enables devices or user equipment's (UEs) without a SIM card or 3GPP subscription to access a subset of the 3GPP eMBMS TV services. Certain ROM enabled UEs are only capable of MBMS reception.

Now, baseband resource capability of the UE is affected with FeMBMS services in ROM session. The baseband resource capability in general refers to processing and/or computational capability of the UE and can also include maximum size of DFT/FFT, maximum power consumption, maximum throughput, maximum number of scheduled entities or modules per transmission timing interval (TTI), maximum number of scheduled physical resource blocks (PRBs), and maximum number of physical channels. FeMBMS services can use 7.5 KHz and 1.25 KHz sub-carrier spacing (SCS). In some cases, time division multiplexing (TDM) of the services with different SCS is also possible. With full bandwidth and lower SCS, the UE needs higher computational capability. For example, Discrete Fourier Transform (DFT) size increases 2 times and 12 times for 7.5 KHz & 1.25 KHz SCS, respectively.

Further, the UE cannot support unicast operation with same baseband resource capability. As such, Carrier Aggregation (CA) configuration needs to be handled by evolved NodeB (eNB) accordingly. Further, the eNB handling unicast and the eNB providing FeMBMS services in the ROM session may belong to different PLM/networks/operators and have no coordination with each other.

Further, dynamic baseband resource capability information needs to be signaled by the UE. Considering, the UE signals maximum supported bandwidth T and scaling factors $A^{(1.25)}$ & $A^{(7.5)}$, the CA configuration has to meet constraints as provided by the equation (1)

$$T > \sum_{c=1}^{C} \left( R_c B_c I_c^{(15\ kHz)} + A^{(7.5)} B_c I_c^{(7.5\ kHz)} + A^{(1.25)} B_c I_c^{(1.25\ kHz)} \right) \quad (1)$$

Where C is the total number configured carrier components for the UE, $B_c$ is the bandwidth for carrier c given in number of physical resource blocks, $R_c$ is the number of spatial layers supported by carrier c and $I_c^{(xKHz)}=1$ if carrier c is x KHz sub-carrier spacing and 0 otherwise.

The UE can report bandwidth (BW), Absolute Radio Frequency Channel Number (ARFCN), and SCS, as per the ROM session to account for reduction in UE's baseband resource capability and resultant CA configuration to be applied by the eNB. However, baseband resource capability is regained by the UE in the case when there is complete stop/loss of reception and/or interest in FeMBMS services by the UE in the ROM session. The resultant gain in baseband resource capability is not indicated by UE to the eNB. This results in degraded performance due to inferior CA configuration still applicable to the UE.

Further, triggers related to both legacy MBMS services and FeMBMS services in ROM session causes a complete list of services interest indications, which pertain to both the legacy MBMS services and the FeMBMS services in ROM session, to be communicated each time. This leads to excessive signaling traffic on reverse link per UE for the eNB. The eNB has no control over the signaling traffic as ROM frequencies/services/triggers are controlled by the UE or other eNB. Furthermore, prioritization or no-prioritization possibilities for the ROM services with respect to unicast services are not defined. As such, the UE misses the capability and option to control the prioritization and user service experience.

Thus, it would be desirable to provide a solution that can overcome the above-mentioned deficiencies.

SUMMARY

This summary is provided to introduce a selection of concepts in a simplified format that is further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein describes to method and system for notifying baseband resource capability of user equipment.

In accordance with some example embodiments of the inventive concepts, a method of notifying resource capability of user equipment is disclosed. The method includes determining an event related to one or more multimedia multicast-broadcast service (MBMS) service of interest to the UE in receive only mode (ROM) session when a system information related to MBMS is not broadcasted by a serving cell after transmission of an interest indication for MBMS service to the serving cell. The event indicates one of: (a) the UE is not interested in the one or more MBMS service through the ROM session; and (b) the UE is not in reception of the one or more MBMS service through the ROM session. The method includes transmitting a ROM service interest indication for the one or more MBMS service through the ROM session corresponding to the determined event to the serving cell.

In accordance with some example embodiments of the inventive concepts, a system for notifying resource capability of user equipment is disclosed. The system includes at least one processor configured to execute computer readable instructions to determine an event related to one or more multimedia multicast-broadcast service (MBMS) service of interest to the UE in receive only mode (ROM) session when a system information related to MBMS is not broadcasted by a serving cell after transmission of an interest indication for MBMS service to the serving cell. The event indicates one of: (a) the UE is not interested in the one or more MBMS service through the ROM session; and (b) the UE is not in reception of the one or more MBMS service through the ROM session. The at least one processor configured to execute computer readable instructions to transmit a ROM service interest indication for the one or more MBMS service through the ROM session corresponding to the determined event to the serving cell.

Some advantages of the present disclosure include, but not limited to, enabling notifying resource capability of the UE to the serving cell by way of transmitting the interest in one or more MBMS service through the ROM session. This leads to improved performance as the serving cell is able to apply updated CA configuration based on the resource capability of the UE.

These aspects and advantages will be more clearly understood from the following detailed description taken in conjunction with the accompanying drawings and claims.

BRIEF DESCRIPTION OF THE DRAWINGS

These and other features, aspects, and/or advantages of the present disclosure will become better understood when the following detailed description is read with reference to the accompanying drawings in which like characters represent like parts throughout the drawings, wherein:

FIG. 7A & FIG. 7B to FIG. 9 illustrates an example diagram of use of interest indication message(s) according to the present disclosure.

Figure 1:
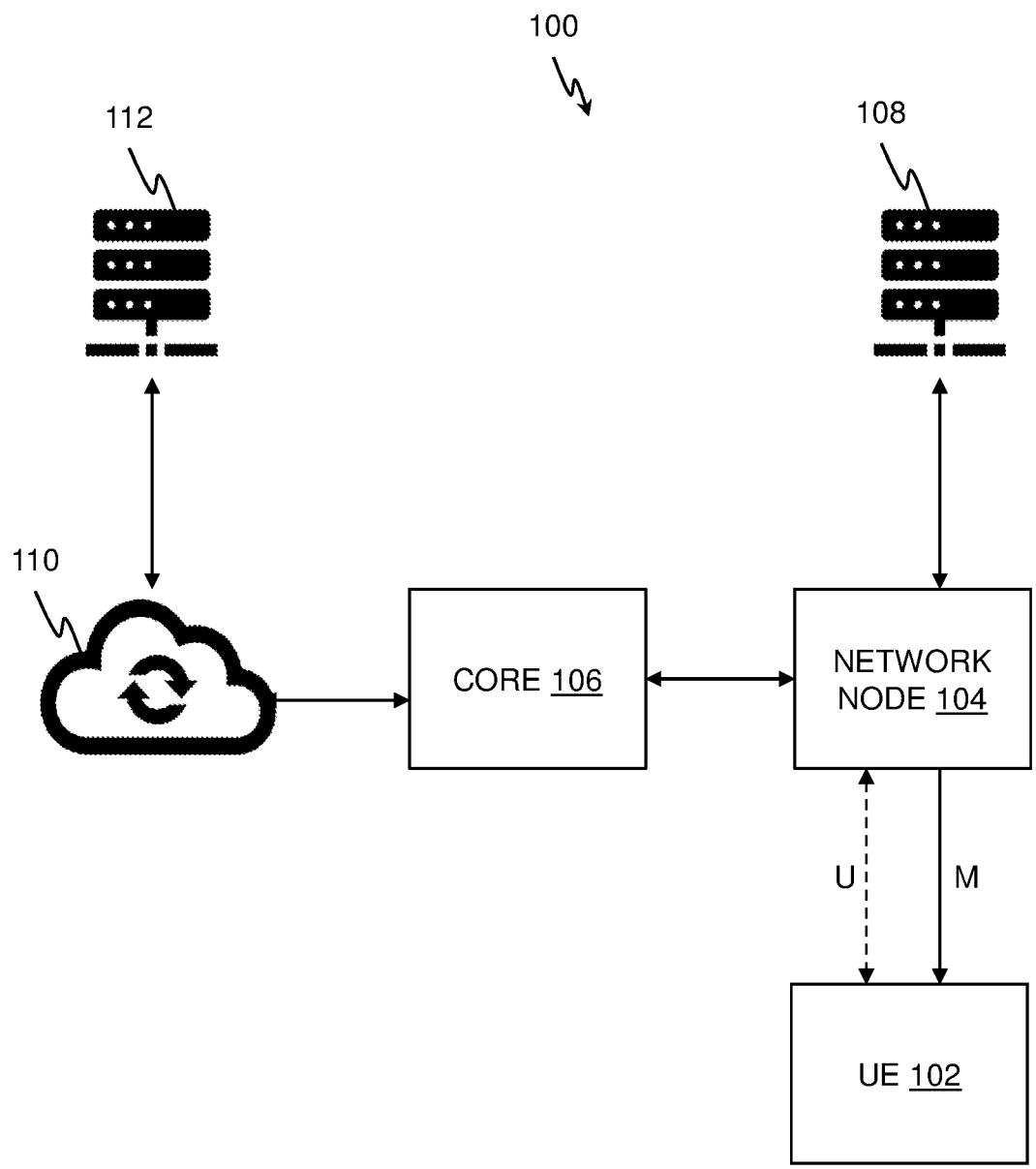
FIG. 1 illustrates an example wireless network depicting transmission of the Multimedia Broadcast Multicast Services (MBMS) service.

Further, skilled artisans will appreciate that elements in the drawings are illustrated for simplicity and may not have been necessarily been drawn to scale. For example, the flow charts illustrate the method in terms of some operations involved to help to improve understanding of aspects of the present disclosure. Furthermore, in terms of the construction of the device, one or more components of the device may have been represented in the drawings by conventional symbols, and the drawings may show some specific details that are pertinent to understanding some example embodiments of the inventive concepts so as not to obscure the drawings with details that will be readily apparent to those of ordinary skill in the art having benefit of the description herein.

DETAILED DESCRIPTION

For the purpose of promoting an understanding of the principles of the disclosure, reference will now be made to some example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting. Embodiments of the present disclosure will be described below in detail with reference to the accompanying drawings.

FIG. 1 illustrates an example wireless network 100 depicting transmission of the Multimedia Broadcast Multicast Services (MBMS) service. Examples of the MBMS services include but not limited to a news service, a sports service, video service, etc. The wireless network 100 includes user equipment (UE) 102, network node 104, and a network core 106. The UE 102 can be in communication with the network node 104. The network node 104 can be any of eNodeB, eNB, gNodeB, gNB, edge node. The network node 104 can be in communication with other network nodes (not shown in the figure) and Multicast Coordination Entity (MCE) (not shown in the figure). The MCE allocates time/frequency radio resources for the MBMS services, and determines the radio configuration (e.g., a modulation and coding scheme (MCS)) for the MBMS services. The network node 104 may be connected with content provider 108 to provide directly MBMS services to the UE 102. The MBMS services can be provided at different frequencies. In addition, the UE 102 can be connected with other network nodes (not shown in the figure) to obtain MBMS services at other frequencies.

The network node 104 may be connected with the network core 106 (for e.g., Evolved Packet Core (EPC)) to provide access point to the network core 106 to the UE 102. The network core 106 can include various entities such as Mobility Management Entity (MME), Multimedia Broadcast Multicast Service (MBMS) Gateway, a Broadcast Multicast Service Center (BM-SC), and a Packet Data Network (PDN) Gateway, etc., to provide MBMS services to the UE 102. The network core 106 may be connected with IP services 110 so as to connect with a content service 112 to provide MBMS services to the UE 102. The UE 102 can receive the MBMS service in unicast mode (represented by dashed bidirectional line & reference character 'U') or broadcast/multicast mode (represented by solid unidirectional line & reference character 'M'). In the unicast mode, the UE 102 can receive and transmit data on dedicated bidirectional channel. In the broadcast mode, the UE 102 can receive the information on a shared unidirectional channel. In the multicast mode, the UE 102 having a subscription to the MBMS service can receive the information on the shared unidirectional channel.

Figure 2:
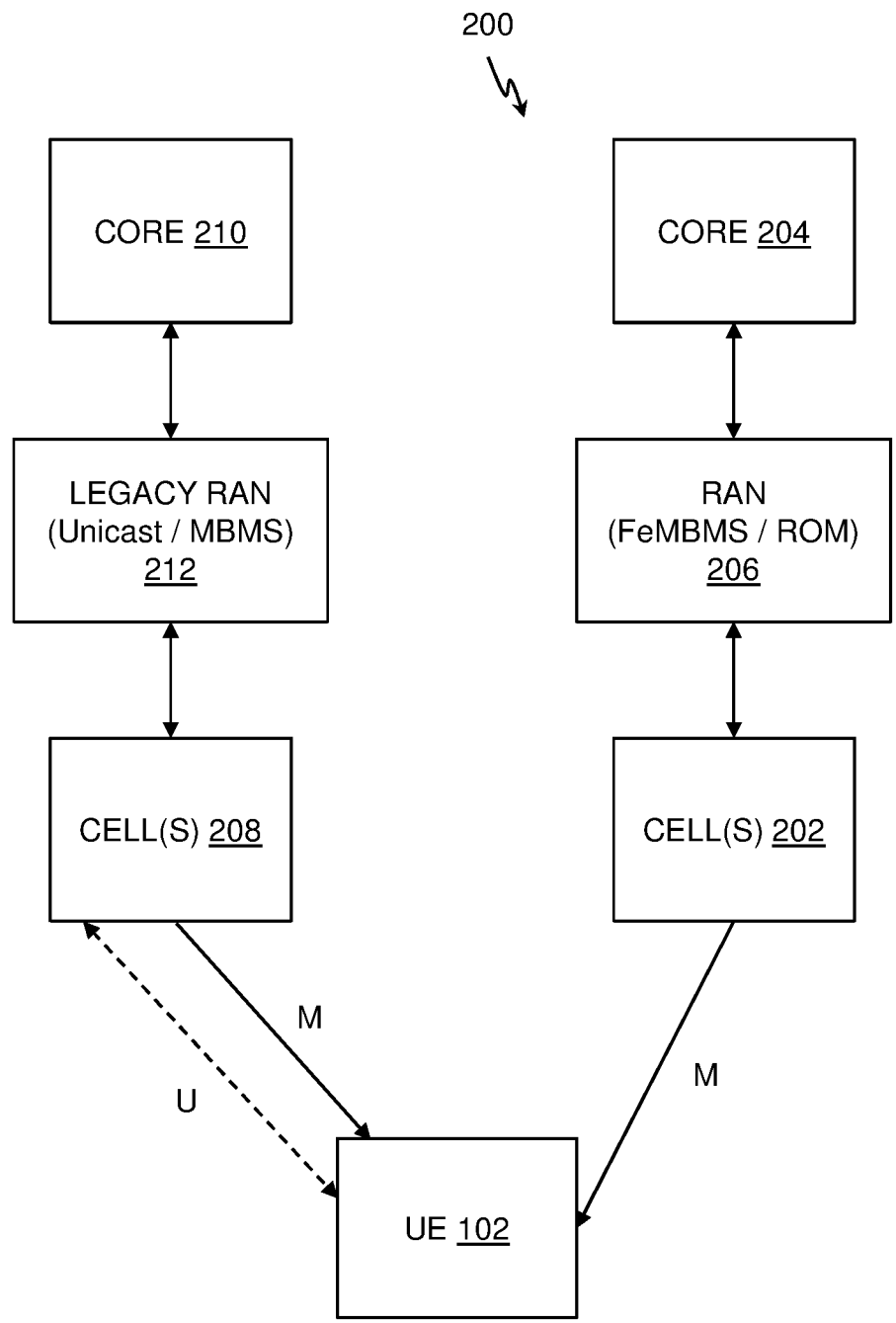
FIG. 2 illustrates an example wireless network depicting transmission of the Further evolved Multimedia Broadcast Multicast Services (FeMBMS) service.

FIG. 2 illustrates an example wireless network 200 depicting transmission of the Further evolved Multimedia Broadcast Multicast Services (FeMBMS) service. In the example, the UE 102 may be enabled in receive only mode (ROM) with or without independent unicast. The ROM is enabled in the UE 102 using implementation-specific means (e.g. factory configuration, user interface). As would be understood, the ROM enabled user equipment's are capable of accessing a subset of the 3GPP eMBMS TV services without a SIM card or 3GPP subscription. Certain ROM enabled user equipment's are only capable of MBMS reception.

In an example, the UE 102 enabled in ROM without independent unicast can only receive MBMS service and is not capable of establishing unicast connectivity to receive unicast services. Examples of the unicast services include voice call services, video call services, etc. As such, the UE 102 may be connected to cell(s) 202 capable of providing one or more MBMS services in ROM session. The cell(s) 202 may be connected with a network core 204 (for e.g., Evolved Packet Core (EPC)) of a first operator through radio access network (RAN) 206 to provide one or more MBMS services in ROM session (or FeMBMS services in ROM session) to the UE 102.

In another example, the UE 102 enabled in ROM with independent unicast can receive MBMS service and is also capable of establishing unicast/multicast connectivity. As such, the UE 102 may be further connected to cell(s) 208 capable of providing one or more legacy MBMS services (i.e., MBMS services received when the UE is not in ROM session) in unicast or broadcast/multicast mode. The cell(s) 208 may be connected with a network core 210 (for e.g., Evolved Packet Core (EPC)) of a second operator through legacy radio access network (RAN) 212 to provide one or more legacy MBMS services and unicast services to the UE 102.

Figure 3:
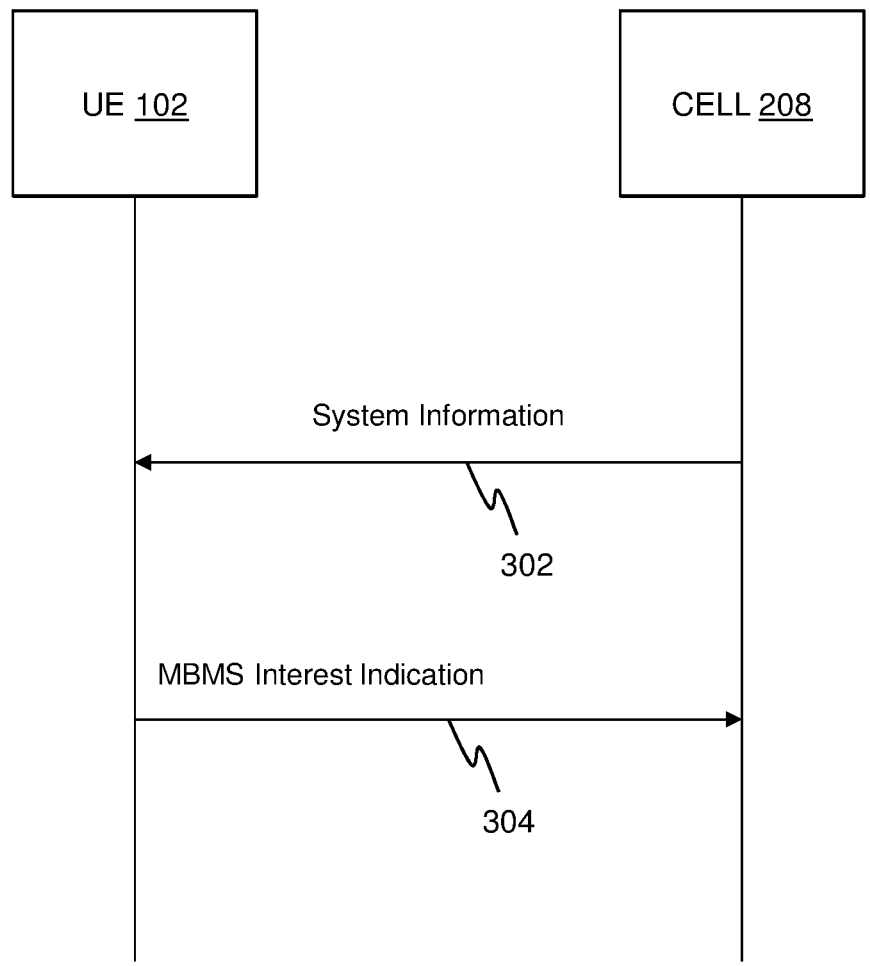
FIG. 3 illustrates an example diagram of use of an MBMS interest indication message.

Typically, the UE 102 in a connected mode (for e.g., in RRC connected state) may send an MBMS interest indication message to serving cell(s) to indicate a list of frequencies of interest to the UE 102. The UE may determine frequency of interest from a system information message, for e.g., system information block (SIB) 15 message, received from the serving cell(s). Accordingly, FIG. 3 illustrates an example diagram of use of an MBMS interest indication message. The example diagram illustrates communication between the UE 102 and the cell 208. At 302, the cell 208 sends a system information message, for e.g., SIB15 message, to the UE 102 indicating a list of neighboring frequencies and a list of current frequencies, where each frequency in the list includes a list of MBMS service area identities (SAIs) supported by a respective frequency.

At 304, the UE 102 generates and sends a MBMS interest indication message listing at least one frequency of interest and/or at least one alternative frequency of interest. However, baseband resource capability of the UE 102 is affected with MBMS service(s) in ROM session. The baseband resource capability in general refers to processing and/or computational capability of the UE and can also include maximum size of DFT/FFT, maximum power consumption, maximum throughput, maximum number of scheduled entities or modules per transmission timing interval (TTI), maximum number of scheduled physical resource blocks (PRBs), and maximum number of physical channels The baseband resource capability is regained by the UE 102 in the case when there is complete stop/loss of reception and/or interest in MBMS service(s) in ROM session by the UE 102 in the ROM session. The resultant gain in baseband resource capability is not indicated by UE 102 to the serving cell 208.

Figure 4:
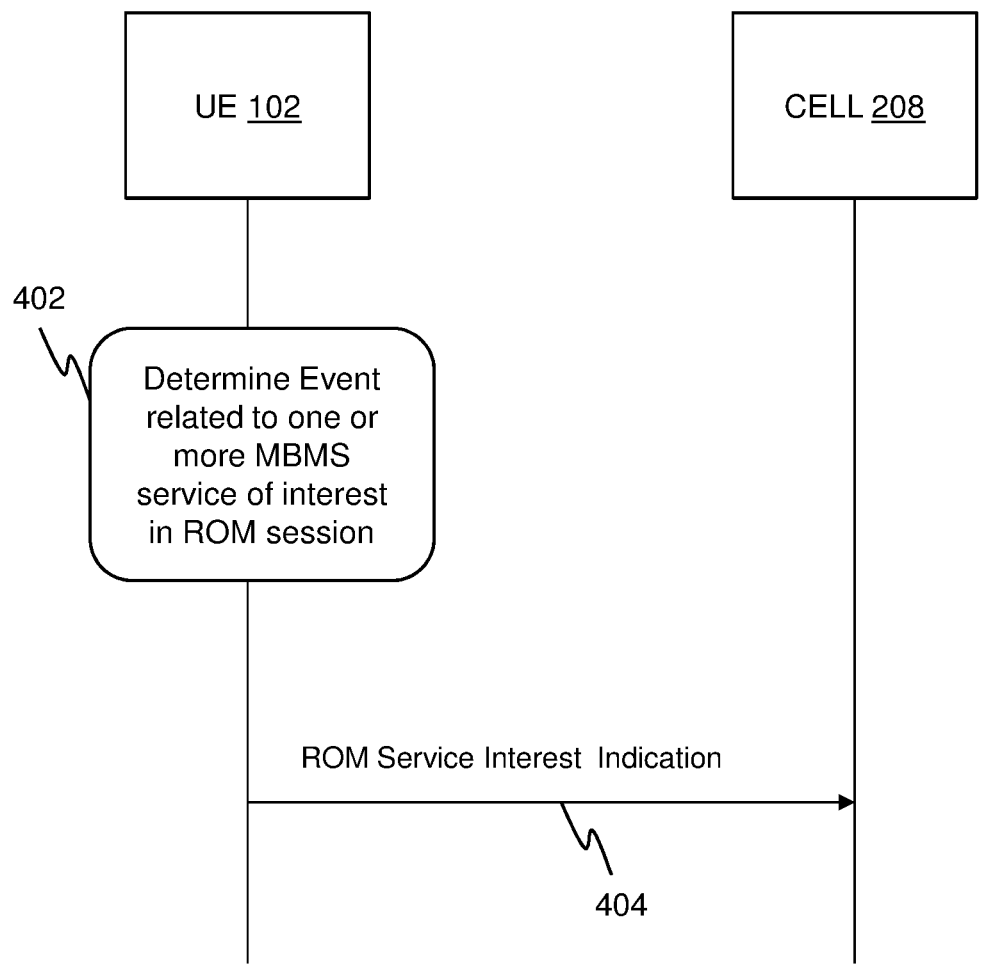
FIG. 4 illustrates an example diagram of use of interest indication according to the present disclosure.

In accordance with the embodiments of the present disclosure, the UE 102 notifies resource capability to serving cell 208 when there is complete stop/loss of reception and/or interest in MBMS service(s) in ROM session. Accordingly, FIG. 4 illustrates an example diagram of use of interest indication according to the present disclosure. At 402, the UE 102 determines an event related to one or more MBMS service of interest to the UE 102 in ROM session when user equipment information related to MBMS service, for e.g., SIB2 message, is not broadcasted by the cell 208 after transmission of an interest indication for MBMS service to the cell 208. The event indicates one of: (a) the UE 102 is not interested in the one or more MBMS service through the ROM session; and (b) the UE 102 is not in reception of the one or more MBMS service through the ROM session. At step 404, the UE 102 transmits a ROM service interest indication for the one or more MBMS service through the ROM session corresponding to the determined event to the serving cell 208.

Figure 5:
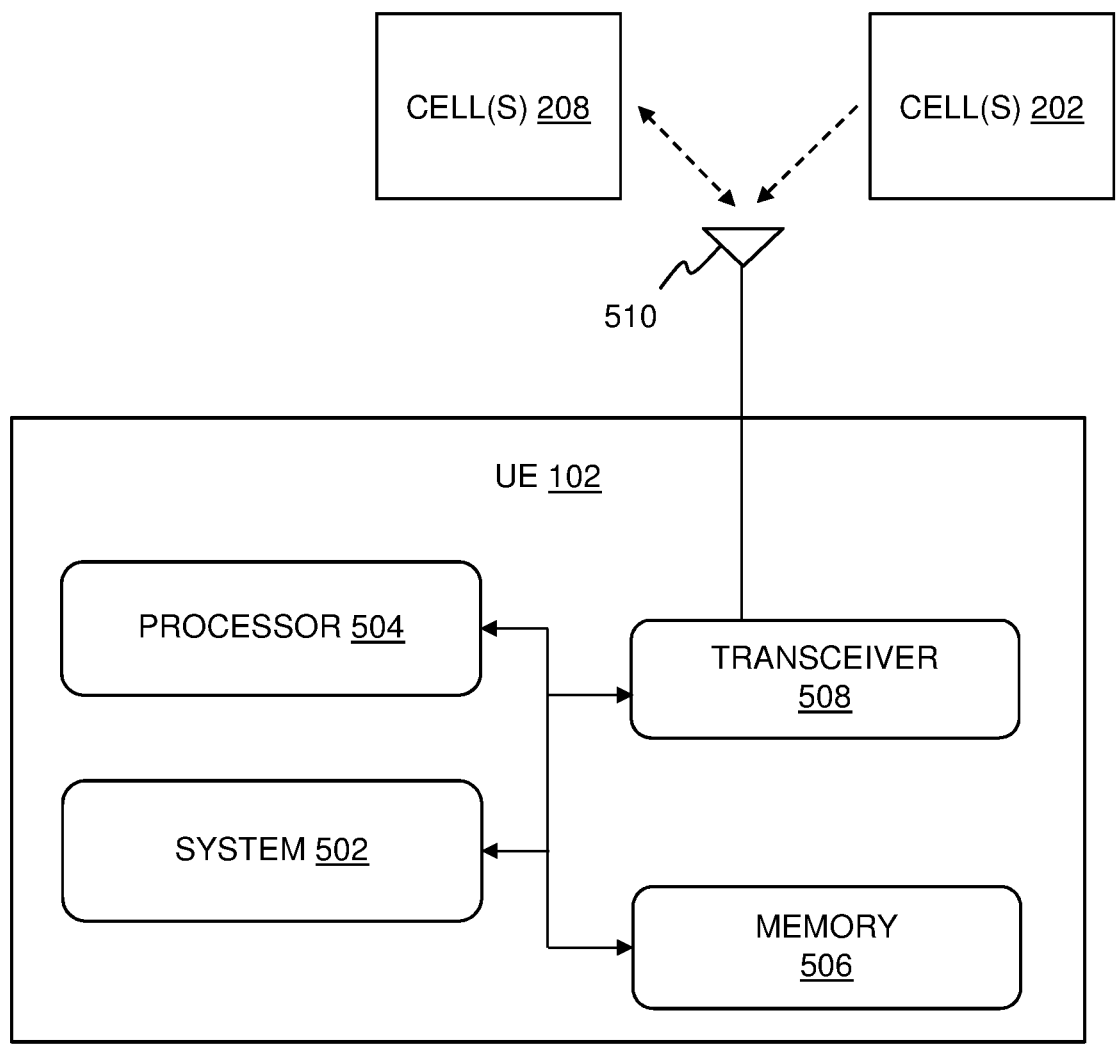
FIG. 5 illustrates an example block diagram of user equipment employing a system to notify the resource capability according to the present disclosure.

FIG. 5 illustrates an example block diagram of the UE 102 employing a system 502 to notify the resource capability according to the present disclosure. The UE 102 may further include a processor 504, a memory 506, and a transceiver 508. The system 502, the processor 504, the memory 506, and the transceiver 508 may be communicatively coupled with each other via a bus (illustrated using directional arrows). The transceiver 508 is coupled to one or more antennas 510. The transceiver 508 provides a mechanism for communicating with the cell 202 and the cell 208 over a transmission medium.

The processor 504 may be a single processing unit or a number of units, all of which could include multiple computing units. The processor 504 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 504 may be configured to fetch and/or execute computer-readable instructions and/or data stored in the memory 506.

The memory 506 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

Figure 6:
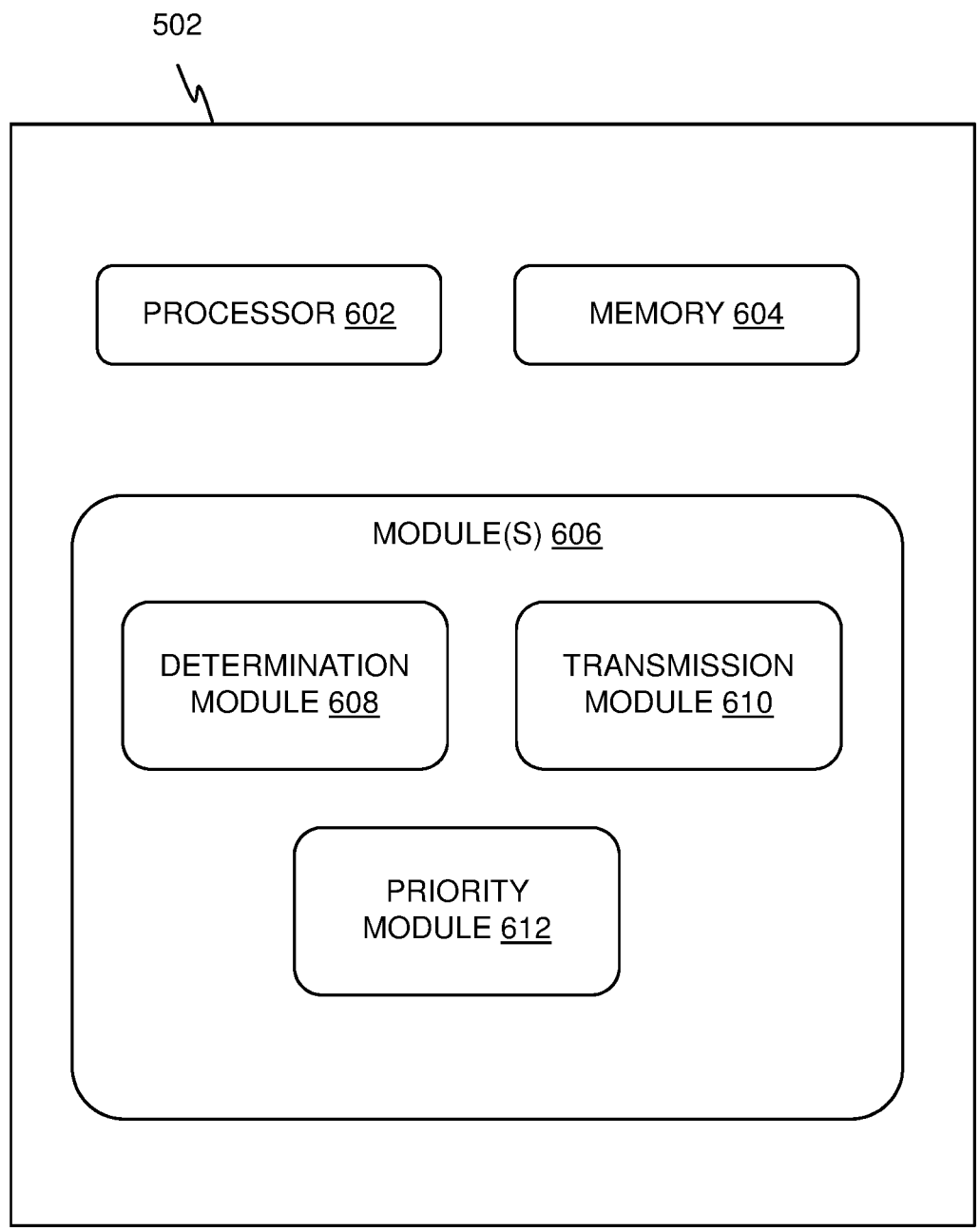
FIG. 6 illustrates an example block diagram of the system to notify the resource capability according to the present disclosure.

FIG. 6 illustrates an example block diagram of the system 502 to notify the resource capability according to the present disclosure. The system 502 includes a processor 602, a memory 604, and module(s) 606. The processor 602, the memory 604, and the module(s) 606 may be communicatively coupled with each other. The processor 602 may be a single processing unit or a number of units, all of which could include multiple computing units. The processor 602 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 602 may be configured to fetch and/or execute computer-readable instructions and/or data stored in the memory 602.

The memory 604 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

In an embodiment, the module(s) 606 may include a determination module 608, a transmission module 610, and a priority module 612. The determination module 608, the transmission module 610, and the priority module 612 may be in communication with each other. The operations described herein can be performed by any of the system 502, the processor 504, the determination module 608, the transmission module 610, and the priority module 612.

Figure 7A:
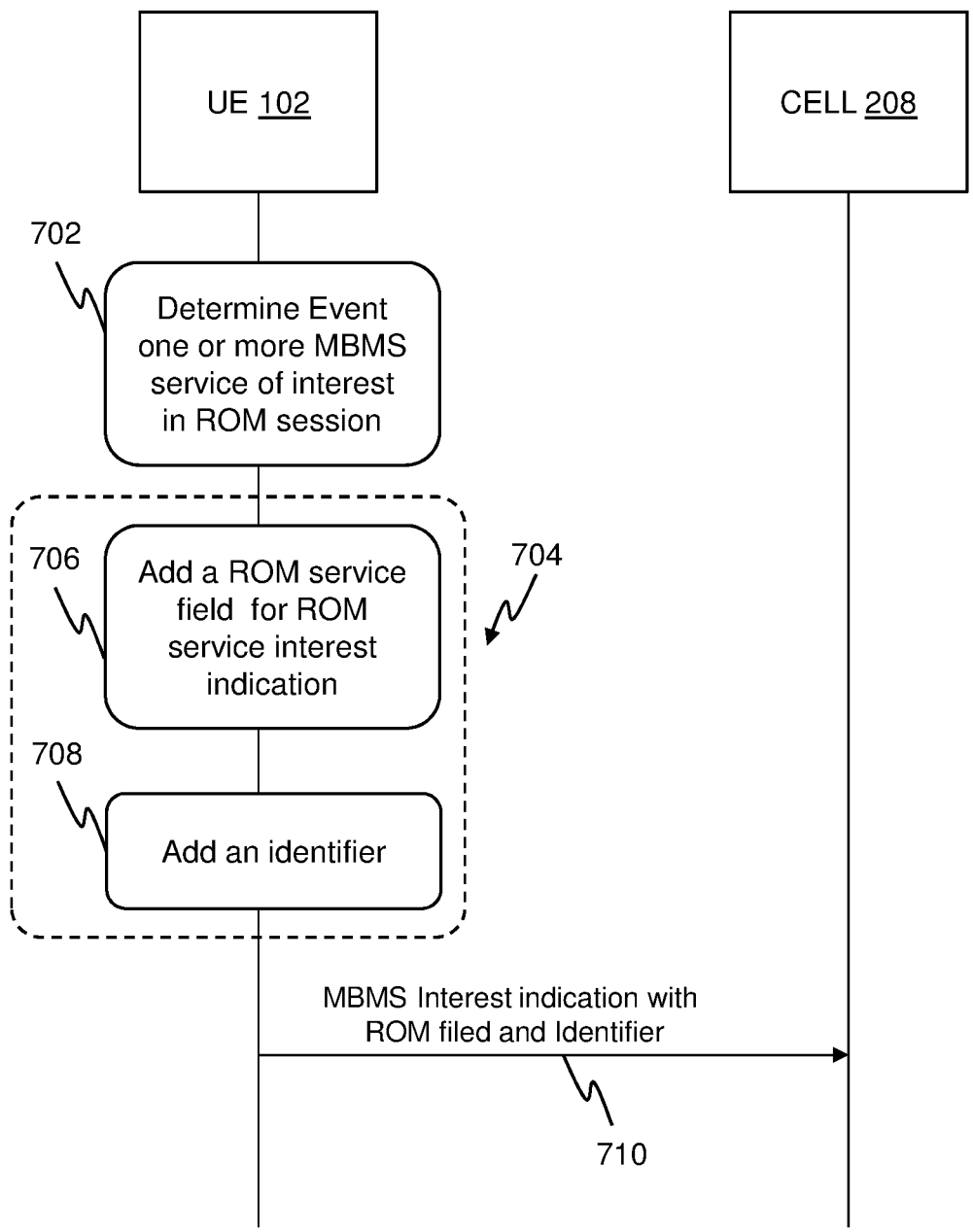

In accordance with the present embodiments, FIG. 7A illustrates an example diagram of use of interest indication message(s) according to the present disclosure. At 702, the determination module 608 determines an event related to one or more MBMS service of interest to the UE 102 in ROM session when user equipment information related to MBMS service, for e.g., SIB2 message, is not broadcasted by the cell 208 after transmission of an interest indication for MBMS service to the cell 208. In an implementation, the event indicates one of: (a) the UE 102 is not interested in the one or more MBMS service through the ROM session; and (b) the UE 102 is not in reception of the one or more MBMS service through the ROM session. The determination module 608 may determine loss of interest or reception based on signal quality measurements of a list of carrier frequencies supported by the serving cell 202 to provide the one or more MBMS service through the ROM session. The signal quality measurements can be Reference Signal Receive Power (RSRP) or RSRQ measurement and may be based on at least one of a Multimedia Broadcast multicast service Single Frequency Network (MBSFN) RSRP measurement, or an MBSFN RSRQ measurement.

In an implementation, the determination module 608 determines the one or more MBMS of interest in the ROM session when the UE 102 is in reception of at least one MBMS in the ROM session. In an example of such implementation, the determination module 608 determines the event when the transmission module 210 did not transmit an MBMS Interest Indication message since the UE 102 entered a connected mode, for e.g., RRC CONNECTED state. As would be understood, the UE 102 can report frequency(s) which provides a currently received or interested MBMS service or frequency(s) which provides a no-longer received or interested MBMS service to the cell 208 through the MBMS Interest Indication message.

In an implementation, the determination module 608 determines the one or more MBMS of interest in the ROM session when the UE 102 is not in reception of the one or more MBMS through the ROM session. In an example of such implementation, the determination module 608 determines the event when the determination module 608 did not receive system information, for e.g., SIB15, broadcasted by the cell 202.

At step 704, the transmission module 610 transmits a ROM service interest indication for the one or more MBMS service through the ROM session corresponding to the determined event to the serving cell 208. The transmission module 610 transmits the ROM service interest indication based on the list of carrier frequencies supported by the serving cell 202. As such, the serving cell 202 sends the list of frequencies for which UE 102 is allowed to indicate MBMS interest indication message with respect to the MBMS services that UE 102 is receiving and/or interested to receive in receive only mode on ROM session to the determination module 608 and the transmission module 610. Therefore, the transmission module 610 cannot trigger or report pertaining to other frequencies than the configured ones. This way the serving cell 202 controls the behavior of UE 102 and avoids unnecessary, irrelevant and frequent signaling from the UE 102.

Accordingly, at step 706, the transmission module 610 adds a ROM service field in a MBMS interest indication message to identify at least one of the ROM service interest indication, and a list of carrier frequencies supporting the one or more MBMS service through the ROM session. At step 708, the transmission module 610 adds an identifier in the MBMS interest indication message to identify a presence of at least one of the ROM service field in the MBMS interest indication message and the list of carrier frequencies.

In some example embodiments, the event indicates the UE 102 is not interested in or did not receive any MBMS services through the ROM session. In other words, the UE 102 has complete stop (i.e., reception) or loss of interest in any of MBMS services. As such, the ROM service field can include a value '0' for the MBMS services. Accordingly, the identifier in the MBMS interest indication message indicates the ROM service field has '0' value.

At step 710, the transmission module 610 triggers a procedure for sending the MBMS interest indication message with the identifier and/or the ROM service field identifying at least one of the ROM service interest indication and the list of carrier frequencies to the cell 208. As such, the transmission module 610 prepares the MBMS interest indication message as described above and sends the MBMS interest indication message to the cell 208. In an example, the transmission module 610 transmits the MBMS interest indication message to the cell 208 through an MBMS radio bearer (MRB) or single cell point to multipoint MBMS radio bearer (SC-MRB) when the UE 102 is in connected mode (for e.g., in RRC connected state). The MBMS interest indication message can be transmitted through a dedicated control channel (DCCH) which is a logical channel. A signaling radio bearer (SRB) for the MBMS interest indication message is an SRB1, and the MBMS interest indication message can be transmitted based on an acknowledgement mode (AM). In an example, the transmission module 610 triggers a RACH procedure to establish a connection with the cell 208 when the UE 102 is not in the connected mode to transmit the MBMS interest indication message. Thus, the baseband resource capability is regained by the UE 102 when there is complete stop/loss of reception and/or interest in MBMS services in ROM session is now indicated by the UE to the cell 208.

Figure 7B:
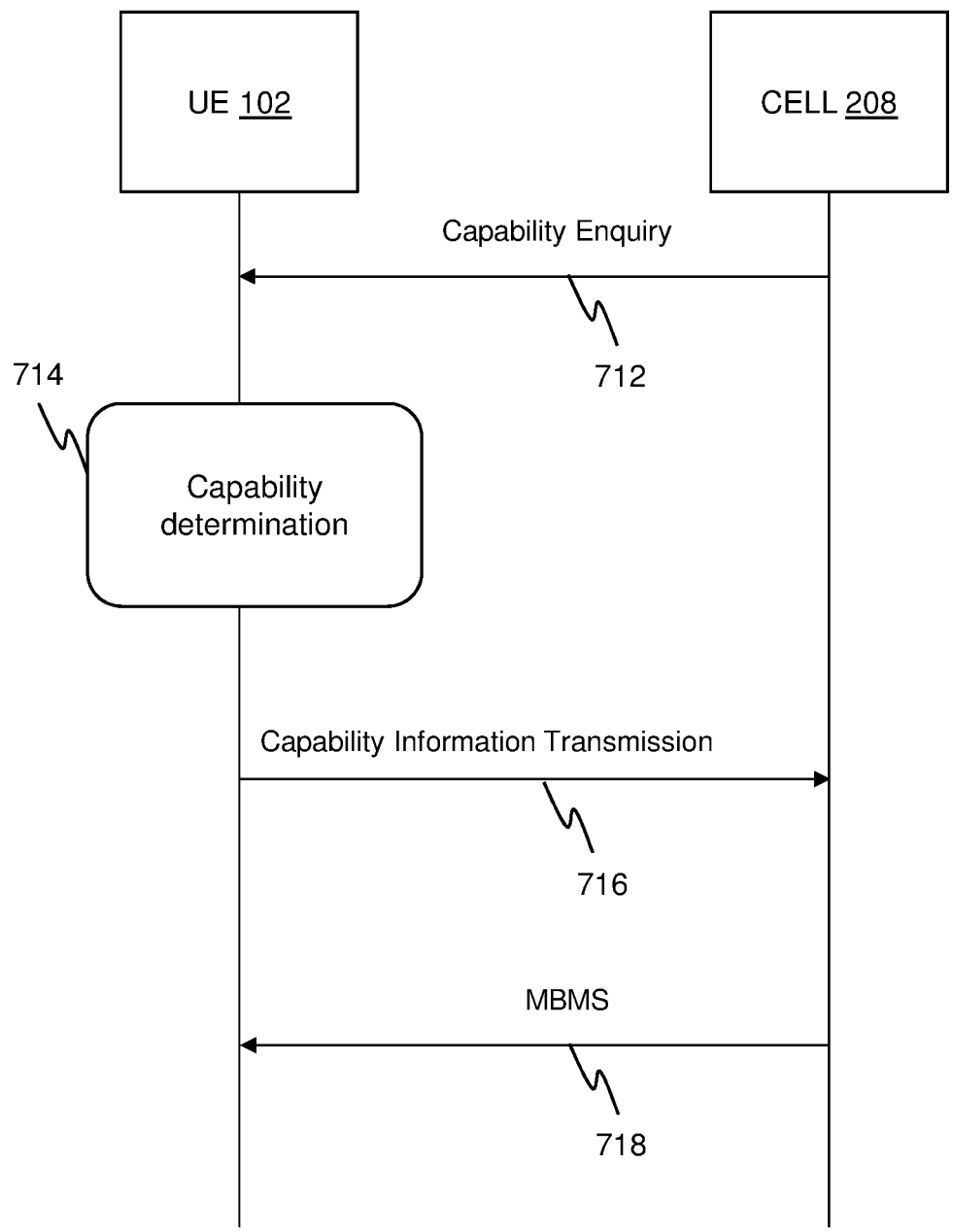

Referring to FIG. 7B, an example diagram for responding to an interest indication is illustrated. Accordingly, at step 712, the determination module 608 receives a capability enquiry message from the serving cell 208 in response to transmitting the ROM service interest indication at step 710. At step 714, the determination module 608 determines a capability of the UE 102 in response to the capability enquiry message. The determination module 608 determines the capability of the UE 102 using techniques as known in the art. At step 716, the transmitting module 610 transmits a capability message comprising information about the capability of the UE 102 to the serving cell 208. The capability information comprises an RRC feature group indicator, indicating the MBMS and/or FeMBMS and/or ROM supported by the UE 102. At step 718, the determination module 608 receives the one or more MBMS through one of legacy MBMS channel and a unicast channel from the serving cell 208 in response to transmitting the ROM service interest indication. Thus, the serving cell 208 is now able to apply optimum carrier aggregation configuration due to the baseband capability information sent by the UE 102.

Figure 8:
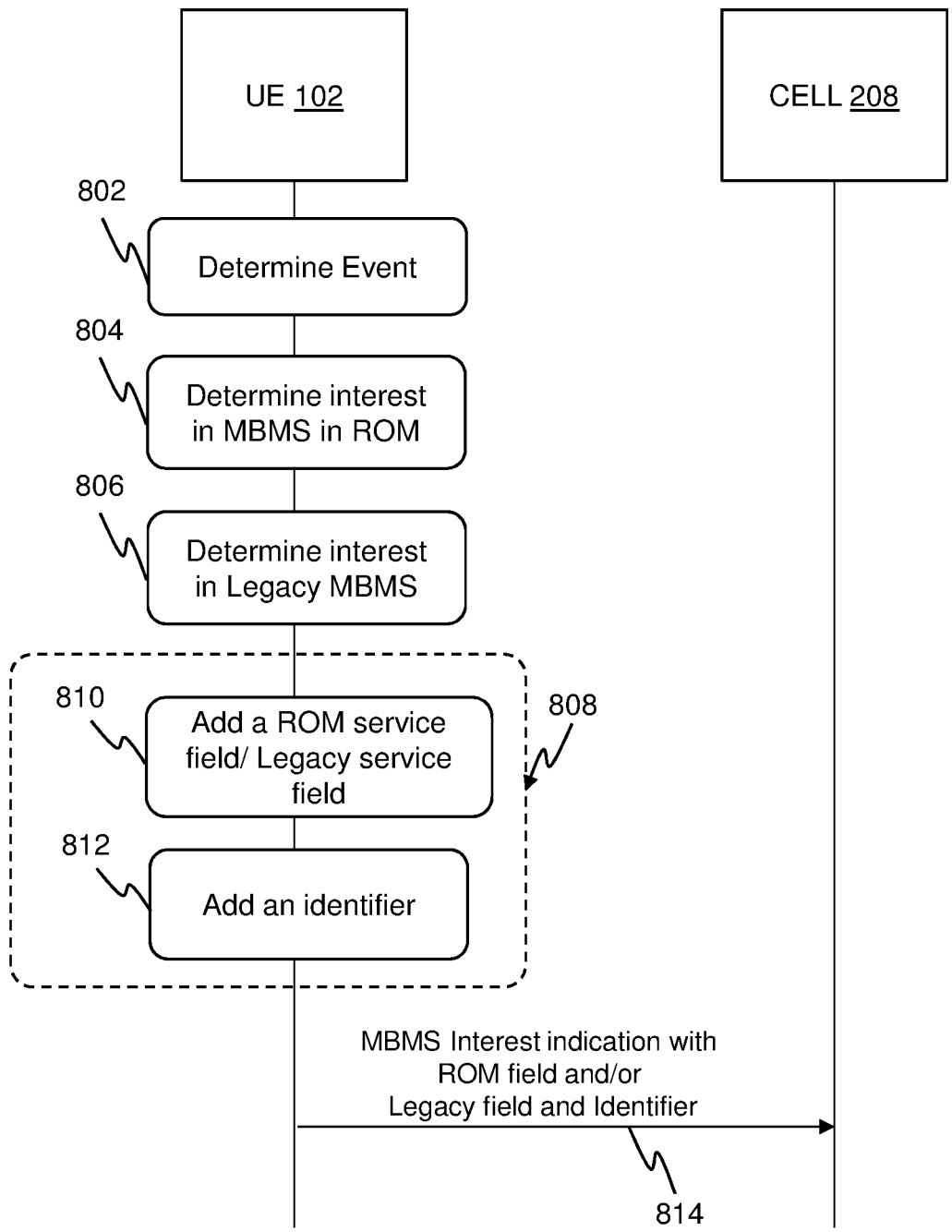

In some example embodiments, the UE 102 may be ROM enabled with independent unicast. As such, the UE 102 may receive one or more MBMS services in ROM session along with one or more legacy MBMS services. Accordingly, FIG. 8 illustrates an example diagram of use of interest indication message(s) according to the present disclosure. At step 802, the determination module 608 determines the event related to one or more MBMS service of interest to the UE 102 in ROM session, as described at step 702. At step 804, the determination module 608 determines an interest of the UE 102 in one or more MBMS services in ROM session. At step 806, the determination module 608 determines an interest of the UE 102 in one or more legacy MBMS services. The interest in MBMS services is determined based on user request or interest in particular service using techniques as known in the art.

At step 808, the transmitting module 610 selectively transmits at least one of legacy service interest indication about the interest of the UE in the one or more legacy MBMS service and a ROM service interest indication.

In one implementation, the UE 102 is having complete loss of interest/stop of MBMS services in ROM session while the UE 102 is having interest in legacy MBMS services. In one implementation, the UE 102 is having complete loss of interest/stop of both the MBMS services in ROM session and the legacy MBMS services. In one implementation, the UE 102 is having complete loss of interest/stop of in legacy MBMS services while the UE 102 is having interest MBMS services in ROM session.

In such implementations, at step 810, the transmitting module 610 adds at least one of a ROM service field and legacy service field in a MBMS interest indication message. The ROM service field identifies at least one of the ROM service interest indication and a list of carrier frequencies supporting the one or more MBMS through the ROM session, as explained earlier. The legacy service field identifies at least one of the legacy service interest indication and a list of carrier frequencies supporting the one or more legacy MBMS, as known in the art.

At step 812, the transmitting module 610 adds an identifier in the MBMS interest indication message to identify one of: an absence and a presence of one or more of: at least one of the ROM service field along with list of carrier frequencies supported by the cell 202 and the legacy service field along with list of carrier frequencies supported by the cell 208.

At step 814, the transmitting module 610 triggers a procedure for sending the MBMS interest indication message with the ROM service field identifying at least one of the ROM service interest indication and the list of carrier frequencies supporting the supporting the one or more MBMS through the ROM session to the cell 208. The transmitting module 610 triggers the procedure for sending the MBMS interest indication message as explained at step 710.

Now, in one implementation, the UE 102 is having complete loss of interest/stop of MBMS services in ROM session while the UE 102 is having interest in legacy MBMS services. As such, the transmitting module 610 triggers the procedure for sending the MBMS interest indication message with the ROM service field only at step 814. In another implementation, the UE 102 is having complete loss of interest/stop of MBMS services in ROM session and in legacy MBMS services. As such, the transmitting module 610 triggers the procedure for sending the MBMS interest indication message with the ROM service field and the legacy service field. Accordingly, at step 814, the transmitting module 610 triggers the procedure for sending the MBMS interest indication message with the ROM service field and the legacy service field identifying at least one of the legacy service interest indication and the list of carrier frequencies supporting the supporting the one or more legacy MBMS to the cell 208. The transmitting module 610 triggers the procedure for sending the MBMS interest indication message as explained at step 710. In one implementation, there are no changes in interest of the UE 102 in MBMS services in ROM session and/or in legacy MBMS services. In such implementation, the transmission module 610 transmits the MBMS interest indication message as known in the art.

Thus, the triggers related to both legacy MBMS services and MBMS services in ROM session causes only a selective interest or no interest in list of frequencies to be communicated to the cells. This reduces signalling load.

Figure 9:
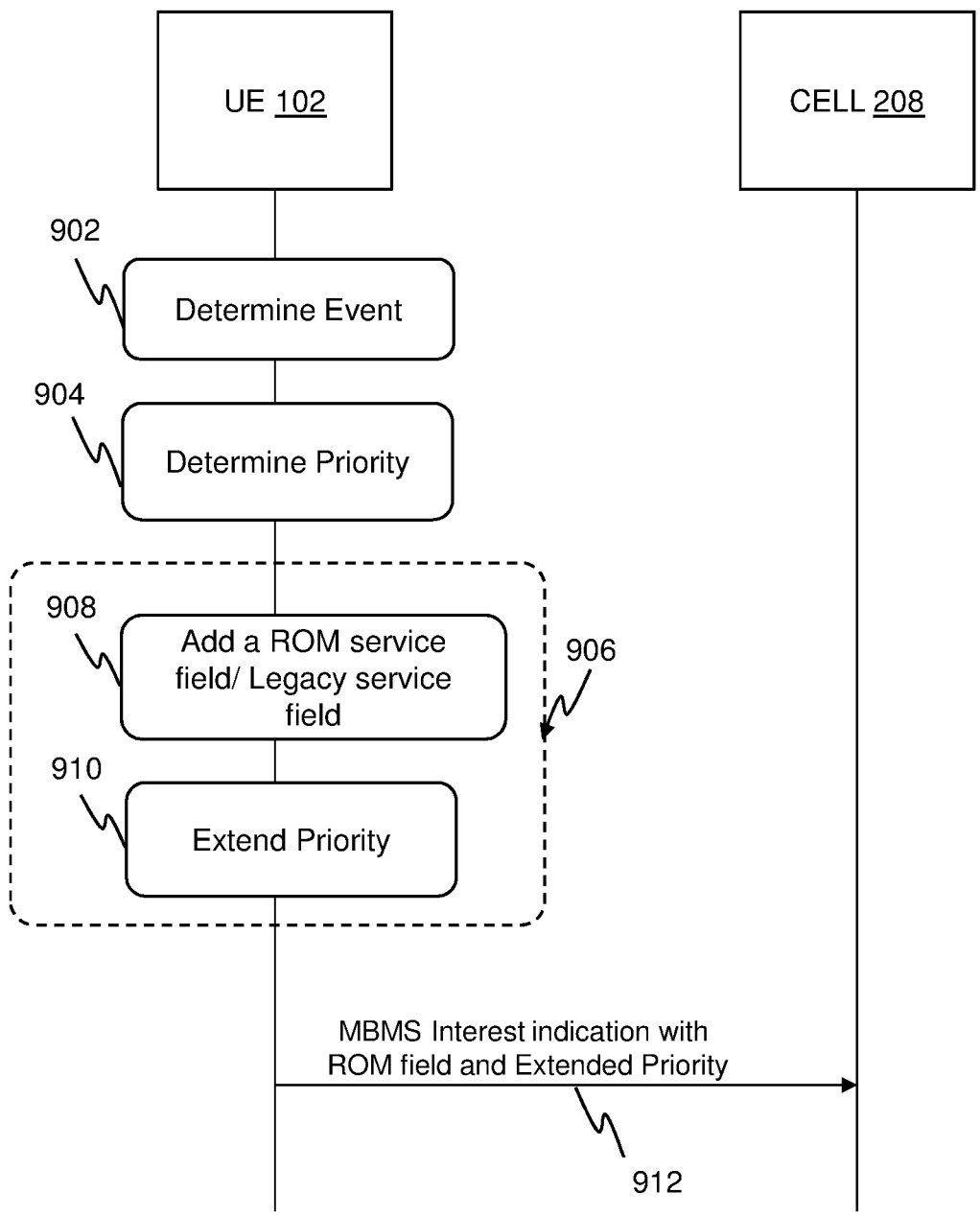

In some example embodiments, allocation of resources, channels, etc., to the UE 102 receiving the MBMS services in ROM session and/or the legacy services is based on a priority assigned to the MBMS services in ROM session and/or the legacy services. Accordingly, FIG. 9 illustrates an example diagram of use of interest indication message(s) according to the present disclosure. At step 902, the determination module 608 determines the event related to one or more MBMS service of interest to the UE 102 in ROM session, as described at step 702.

At step 904, the priority module 612 determines a priority of the one or more MBMS services through the ROM sessions. The priority is determined based on at least one of: a predefined settings, a user-input, one or more services received by the UE 102, performance measurement of the UE 102, and optimal performance criteria of the UE 102. In an example, the predefined settings can explicitly or implicitly indicate one or more frequencies have higher priority. In such example, the predefined settings can be stored in the memory and the priority module 612 can fetch the predefined settings from the memory. In an example, the priority module 612 may provide a notification on the UE 102 to receive the user input. In an example, the priority module 612 may obtain signal quality measurements of a list of carrier frequencies supported by the serving cell 202 and the serving cell 208, power measurements (for e.g., battery status) of the UE 102, bandwidth measurements of the UE 102, concurrent data sessions of the UE 102 in progress, and various subscriptions allotted to the UE 102. The signal quality measurements can be RSRP/RSRQ measurement and may be based on at least one of an MBSFN RSRP measurement, or an MBSFN RSRQ measurement. In an example, the priority module 612 may evaluate the signal quality measurements, power measurements, bandwidth measurements, concurrent data sessions in progress, and subscriptions on the optimal performance criteria. The optimal performance criteria can indicate low power consumption, higher bandwidth requirement, higher charges of usage, low signal, etc.

In some example embodiments, the priority module 612 determines a priority of one or more legacy MBMS services. The priority of the legacy MBMS services is also determined based on at least one of: a predefined settings, a user-input, one or more services received by the UE 102, performance measurement of the UE 102, and optimal performance criteria of the UE 102, as explained above. The priority module 612 then determines the priority of one or more MBMS services through the ROM sessions relative to the priority of the one or more legacy MBMS services. In an example, the priority of MBMS services in ROM session can be lower than a priority of legacy MBMS services.

At step 906, the transmitting module 610 transmits information indicative of the determined priority in conjunction with the ROM service interest indication. In an implementation, the priority indicates the UE 102 is not interested in the one or more MBMS through the ROM session due to the performance measurements evaluated on the performance criteria. For e.g., the UE 102 is not prioritizing MBMS services in ROM sessions due to the need of additional resources. In such implementation, the transmitting module 610 only transmits the ROM service interest indication with '0' interest in MBMS services in ROM session.

In one implementation, the priority indicates the UE 102 is interested in the one or more MBMS through the ROM session. Accordingly, at step 908, the transmitting module 610 adds the ROM service field in a MBMS interest indication message to identify at least one of the ROM service interest indication and a list of carrier frequencies supporting the one or more MBMS through the ROM session, as described at step 704.

At step 910, the transmitting module 610 extends a priority field in the MBMS interest indication message to indicate the priority of one or more MBMS services through the ROM sessions. Typically, a priority field in the MBMS interest indication message indicates whether reception of legacy MBMS services is prioritized over unicast reception by the UE 102. According to the present invention, the UE 102 can now report whether reception of legacy MBMS services excluding MBMS services in ROM session is prioritized over unicast reception through the priority field in MBMS interest indication message. Additionally the priority field in the MBMS interest indication message indicates whether reception of legacy MBMS services is prioritized over ROM services or vice-versa.

At step 912, the transmitting module 610 triggers a procedure for sending the MBMS interest indication message with the ROM service field and the extended priority field, as explained in step 704.

The following section now illustrates the example procedure taken by the UE 102 in accordance with the above embodiments. The purpose of this procedure is to inform E-UTRAN (i.e., the cell 208) that the UE 102 is receiving or is interested to receive MBMS service(s) via an MRB or SC-MRB, and if so, to inform the E-UTRAN about the priority of MBMS versus unicast reception or MBMS service(s) reception in ROM session.

Section 1: Initiation

An MBMS or SC-PTM capable UE in RRC CONNECTED may initiate the procedure in several cases including:
   (1) upon successful connection establishment;
   (2) upon entering or leaving the service area;
   (3) upon session start or stop;
   (4) upon change of interest;
   (5) upon change of priority between MBMS reception and unicast reception;
   (6) upon change to a PCell broadcasting SystemInformationBlockType15;
   (7) upon starting and stopping of MBMS service(s) in ROM; and
   (8) upon change of receive only mode (ROM) frequency, bandwidth (BW), or subcarrier spacing (SCS) of MBMS service(s) in ROM.

Upon initiating the procedure, the UE shall:
  1>if SystemInformationBlockType15 is broadcast by the PCell; or
  1>if mbms-ROM-ServiceIndication is received in SystemInformationBlockType2 from PCell:
    2>ensure having a valid version of SystemInformationBlockType15 for the PCell, if present;
    2>if the UE did not transmit an MBMSInterestIndication message since last entering RRC CONNECTED state; or
    2>if since the last time the UE transmitted an MBMSInterestIndication message, the UE connected to a PCell neither broadcasting SystemInformationBlockType15 nor including mbms-ROM-ServiceIndication in SystemInformationBlockType2:
      3>if the set of MBMS frequencies of interest, determined in accordance with Section 2 described below, is not empty:
        4>initiate transmission of the MBMSInterestIndication message in accordance with Section 3 described below;

2>else:
  3>if the set of MBMS frequencies of interest, determined in accordance with Section 2 described below, has changed since the last transmission of the MBMSInterestIndication message; or
  3>if at least one of the subcarrier spacing or bandwidth parameter of receive only mode MBMS frequency of interest, determined in accordance with Section 2 described below, has changed since the last transmission of the MBMSInterestIndication message; or
  3>if the prioritization of reception of all indicated MBMS frequencies (excluding those pertaining to receive only mode) compared to reception of any of the established unicast hearers has changed since the last transmission of the MBMSInterestIndication message:
    4>initiate transmission of the MBMSInterestIndication message in accordance with Section 3 described below;
    In one of the embodiments of the present disclosure, the UE provides user level prioritization for ROM services or incorporate prioritization for ROM services at par with legacy MBMS. To this end, MBMS priority field is extended to incorporate ROM services as well.
  3>else if SystemInformationBlockType20 is broadcast by the PCell:
    4>if since the last time the UE transmitted an MBMSInterestIndication message, the UE connected to a PCell not broadcasting SystemInformationBlockType20; or
    4>if the set of MBMS services of interest determined in accordance with Section 2a described below is different from mbms-Services included in the last transmission of the MBMSInterestIndication message;
  5> initiate the transmission of the MBMSInterestIndication message in accordance with Section 3 described below.

Section 2: Deter Nine MBMS Frequencies of Interest
The UE shall:
  1>consider a frequency to be part of the MBMS frequencies of interest if the following conditions are met:
    2>if at least one MBMS session the UE is receiving or interested to receive via an MRB or SC-MRB is ongoing or about to start; and
    2>for at least one of these MBMS sessions either SystemInformationBlockType15 acquired from the PCell includes for the concerned frequency one or more MBMS SAIs as indicated in the USD for this session; and
    2>the UE is capable of simultaneously receiving MRB s and/or is capable of simultaneously receiving SC-MRBs on the set of MBMS frequencies of interest, regardless of whether a serving cell is configured on each of these frequencies or not; and
    2>the supportedBandCombination the UE included in UE-EUTRA-Capability contains at least one band combination including the set of MBMS frequencies of interest;
  2> if there is at least one MBMS session the UE is receiving and/or interested to receive in receive only mode and the supportedBandCombination the UE included in UE-EUTRA-Capability contains at least one band combination including the set of MBMS frequencies of interest for receive only mode;

Section 2a: Determine MBMS Services of Interest
The UE shall:
  1>consider a MBMS service to be part of the MBMS services of interest if the following conditions are met:
    2>the UE is SC-PTM capable; and
    2>the UE is receiving or interested to receive this service via an SC-MRB; and
    2>one session of this service is ongoing or about to start; and
    2>one or more MBMS SAIs in the USD for this service is included in SystemInformationBlockType15 acquired from the PCell for a frequency belonging to the set of MBMS frequencies of interest, determined according to the Section 2 as described above.

Section 3: Actions Related to Transmission of MBMSInterestIndication Message
The UE shall set the contents of the MBMSInterestIndication message as follows:
  1>if the set of MBMS frequencies of interest (excluding those pertaining to receive only mode), determined in accordance with Section 2 as described above, is not empty:
    2>include mbms-FreqList and set it to include the MBMS frequencies of interest sorted by decreasing order of interest, using the EARFCN corresponding with freqBandIndicator included in SystemInformationBlockType1 (for serving frequency), if applicable, and the EARFCN(s) as included in SystemInformationBlockType15 (for neighbouring frequencies);
    2>include mbms's-Priority if the UE prioritises reception of all indicated MBMS above reception of any of the unicast bearers;
    2>if SystemInformationBlockType20 is broadcast by the PCell:
      3>include mbms-Services and set it to indicate the set of MBMS services of interest determined in accordance with Section 2a as described above;
  1>if the UE is receiving MBMS service(s) in receive only mode:
    2>if the supportedBandCombination the UE included in UE-EUTRA-Capability contains at least one band combination including the mbms-ROM-Freq:
      3>include mbms-ROM-Freq, mbms-ROM-SubcarrierSpacing and mbms-Bandwidth;
  1>include triggerType:
    2> set the least significant bit as 1 if mbms-ROM-InfoList is changed from last transmission;
    2> set the most significant bit as 1 if mbms-FreqList is changed from last transmission;
Here triggerType indicates one or more triggers for the MBMSInterestIndication. The least significant bit corresponds to the set of receive only mode frequencies and next bit corresponds to set of other frequencies. A hit is set to 1 if the trigger happened because of corresponding set of frequencies is changed, and 0 otherwise.
In one of the embodiment of the present disclosure, it is possible to have an implementation solution supporting triggerType field to do selective reporting MBMS interest information for legacy and ROM MBMS services as well as another implementation solution where triggerType field is not used.
The UE shall submit the MBMSInterestIndication message to lower layers for transmission.

Section 4: MBMSInterestIndication
The MBMSInterestIndication message is used to inform E-UTRAN that the UE is receiving/interested to receive or no longer receiving/interested to receive MBMS via an MRB or SC-MRB including MBMS service(s) in receive only mode.

Table 1 illustrates an example of the MBMS interest indication message with the ROM service field, the legacy service field, and the identifiers as explained above.

TABLE 1

```
-- ASN1START
MBMSInterestIndication-r11 : :=         SEQUENCE {
   criticalExtensions                   CHOICE {
      c1                                CHOICE {
         interestIndication-r11               MBMSInterestIndication-r11-IEs,
         spare3 NULL, spare2 NULL, spare1 NULL
      } ,
      criticalExtensionsFuture          SEQUENCE { }
   }
}
MBMSInterestIndication-r11-IEs : :=     SEQUENCE {
   mbms-FreqList-r11                    CarrierFreqListMBMS-r11
OPTIONAL,
   mbms-Priority-r11                    ENUMERATED {true}
OPTIONAL,
   lateNonCriticalExtension             OCTET STRING            OPTIONAL,
   nonCriticalExtension                 MBMSInterestIndication-v1310-IEs
OPTIONAL
}
MBMSInterestIndication-v1310-IEs : : =   SEQUENCE {
   mbms-Services-r13                    MBMS-ServiceList-r13
OPTIONAL,
   nonCriticalExtension                 MBMSInterestIndication-v1540-IEs
               OPTIONAL
}
MBMSInterestIndication-v1540-IEs ::=     SEQUENCE {
   mbms-ROM-InfoList-r15                SEQUENCE    (SIZE (1 .. maxMBMS-
ServiceListPerUE-r13) ) OF MBMS-ROM-Info-r15       OPTIONAL,
   nonCriticalExtension                 SEQUENCE { }            OPTIONAL
}
MBMS-ROM-Info-r15 : := SEQUENCE {
   mbms-ROM-Freq-r15                    ARFCN-ValueEUTRA-r9,
   mbms-ROM-SubcarrierSpacing-r15       ENUMERATED   {kHz15,   kHz7dot5,
kHz1dot25},
   mbms-Bandwidth-r15                   ENUMERATED {n6, n15, n25, n50, n75,
n100}
}
-- ASN1STOP
```

In the above Table 1, the mbms-FreqList field indicates a list of frequencies which provide a legacy MBMS service currently received or interested by the UE 102. The mbms-Priority field indicates whether reception of legacy MBMS reception is prioritized over unicast reception by the UE. In an implementation, a value of the mbms-Priority field is true, if the UE prioritises reception of all listed MBMS frequencies, excluding the MBMS frequencies in the ROM session, over reception of any of the unicast bearers. The exclusions are indicated by the MBMSInterestIndication-v1310 field. In an implementation, the mbms-Priority field is omitted if the reception of all listed MBMS frequencies is not prioritized.

The mbms-ROM-Freq field indicates the carrier frequency used by the UE to receive MBMS service(s) in ROM session. The mbms-ROM-InfoList field or the ROM service field indicates list of MBMS service(s) in ROM session related parameters which the UE 102 is receiving. In one implementation, if the UE 102 is no longer receiving MBMS services(s) in ROM, the mbms-ROM-InfoList is omitted. In one implementation, if the UE 102 is no longer receiving MBMS services(s) in ROM, the mbms-ROM-InfoList is set to '0' value. The mbms-ROM-SubcarrierSpacing field indicates subcarrier spacing for MBSFN subframes received by the UE 102 in ROM session. The presence of ROM service field is indicated by the MBMSInterestIndication-v1540 field.

Figure 10:
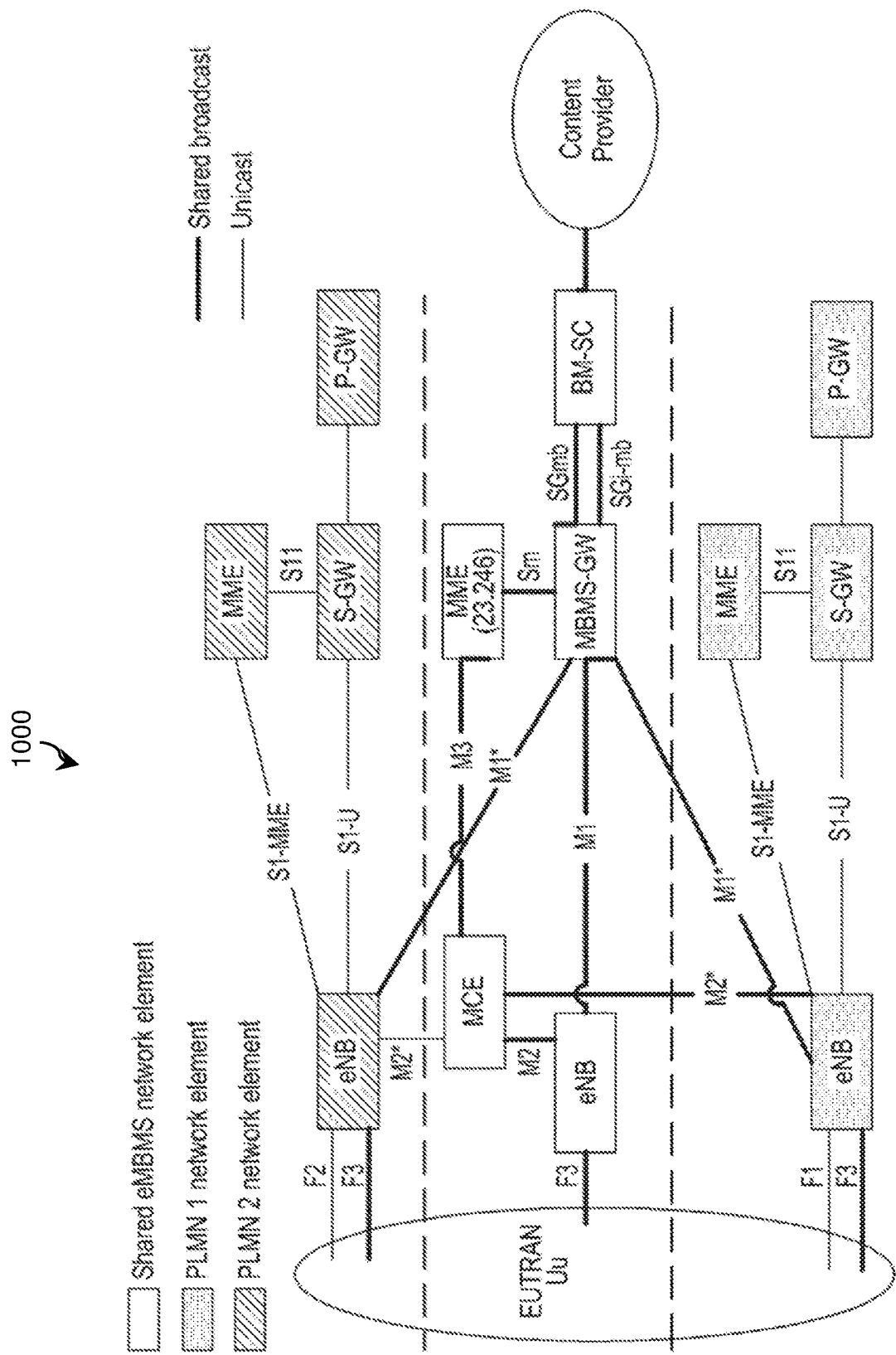
FIG. 10 is a schematic diagrams illustrating data flow between network elements, according to an embodiment of the present invention.

FIG. 10 is a network diagram 1000 illustrating data flow between network elements, according to an embodiment of the present invention. The network comprises at least one of a EUTRAN, plurality of eNodeB, a management control entity (MCE), plurality of mobility management entity (MME), MBMS gateway MBMS-GW, plurality of primary gateway P-GW, plurality of secondary gateway S-GW, and a content provider. During communication between the EUTRAN and the content provider, data transfer can be performed over different network elements forming different network connection. During forming the network connection, one or more network elements can be used as shared MBMS network elements, while other can belong to PLMN network elements. Based on the interest on the MBMS services in ROM session, the UE can transmit the MBMS interest indication message as described earlier.

Figure 11:
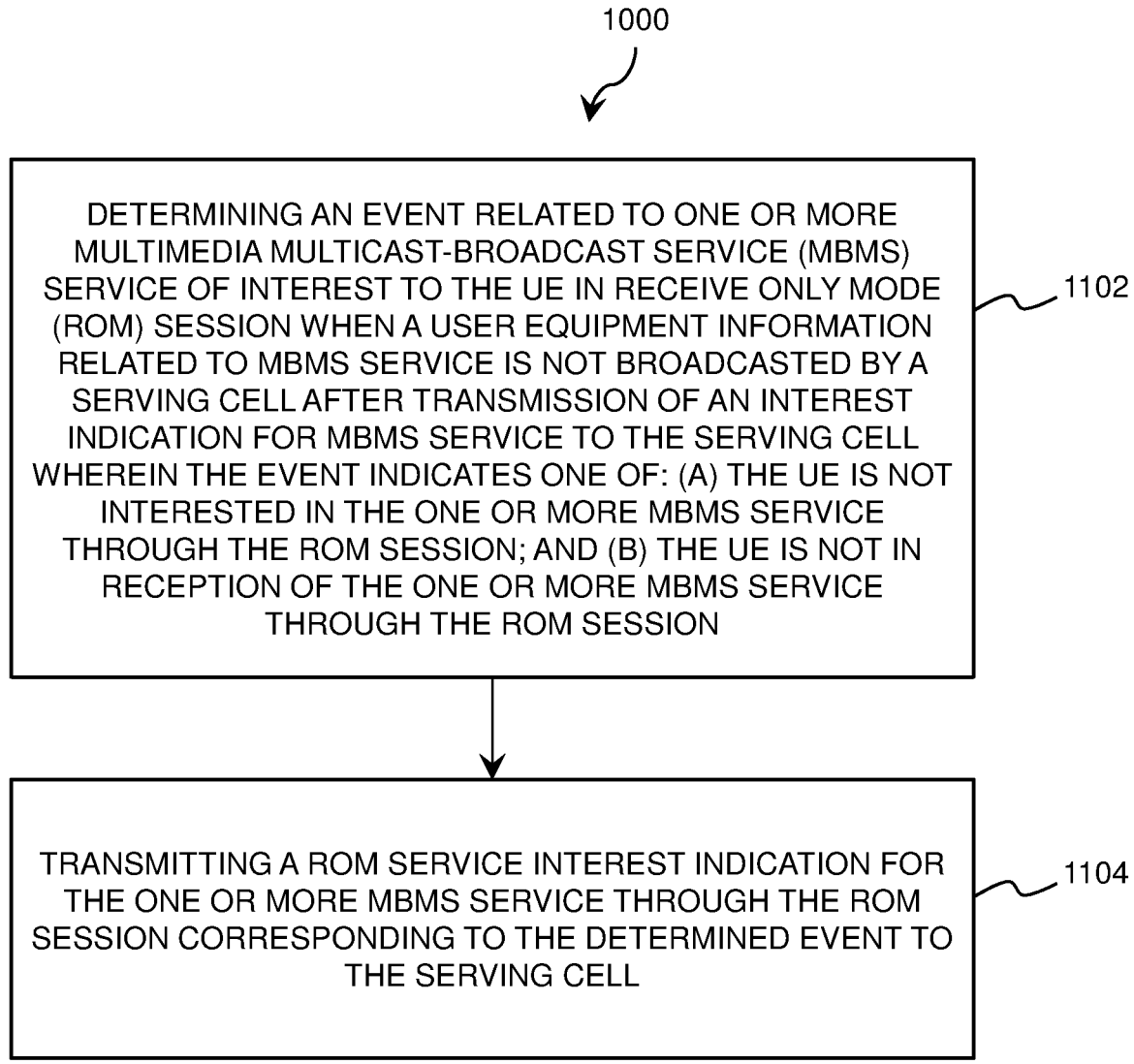
FIG. 11 illustrate flow diagram of method for activating input mode on a voice assistant device, in accordance with some example embodiments of the inventive concepts.

FIG. 11 illustrate flow diagram of method for activating input mode on a voice assistant device, in accordance with some example embodiments of the inventive concepts. The method 1100 may be implemented by the system 502 and/or the UE 102, as described above. Further, for the sake of brevity, details of the present disclosure that are explained in details in the description of FIG. 1 to FIG. 9 are not explained in detail in the description of FIG. 10.

At block 1102, the method 1100 includes determining an event related to one or more multimedia multicast-broadcast service (MBMS) service of interest to the UE in receive only mode (ROM) session when a system information related to MBMS is not broadcasted by a serving cell after transmission of an interest indication for MBMS service to the serving cell The event indicates one of: (a) the UE is not interested in the one or more MBMS service through the ROM session; and (b) the UE is not in reception of the one or more MBMS service through the ROM session.

At block 1104, the method 1100 includes transmitting a ROM service interest indication for the one or more MBMS service through the ROM session corresponding to the determined event to the serving cell. The ROM service interest indication includes at least one of identity of the one or more MBMS service and interest of the UE indicating one of: (a) the UE is not interested in the one or more MBMS service through the ROM session; and (b) the UE is not in reception of the one or more MBMS service through the ROM session. The transmitting of the ROM service interest indication is based on a list of carrier frequencies supported by the serving cell to provide the one or more MBMS service through the ROM session.

In some example embodiments, the method 1100 includes determining the one or more MBMS of interest in the ROM session when one of: (a) the UE is in reception of at least one MBMS in the ROM session and (b) the UE is not in reception of the none or more MBMS through the ROM session.

Further, the step of transmitting the ROM service interest indication at block 1004 comprises further steps. Accordingly, the method 1100 includes adding a ROM service field in a MBMS interest indication message to identify at least one of the ROM service interest indication, and a list of carrier frequencies supporting the one or more MBMS service through the ROM session. The method 1100 includes triggering a procedure for sending the MBMS interest indication message with the ROM service field identifying at least one of the ROM service interest indication and the list of carrier frequencies. In some example embodiments, the method 1100 includes adding an identifier in the MBMS interest indication message to identify a presence of at least one of the ROM service field in the MBMS interest indication message and the list of carrier frequencies.

Further, in some example embodiments the method 1100 includes additional steps. Accordingly, the method 1100 includes determining an interest of the UE in one or more legacy MBMS. The method 1100 includes selectively transmitting at least one of legacy service interest indication about the interest of the UE in the one or more legacy MBMS service and the ROM service interest indication.

Further, in some example embodiments, the step of selective transmitting comprises additional steps. Accordingly, the method 1100 includes adding in a MBMS interest indication message at least one of (a) a ROM service field to identify at least one of the ROM service interest indication and a list of carrier frequencies supporting the one or more MBMS through the ROM session; and (b) a legacy service field to identify at least one of the legacy service interest indication and a list of carrier frequencies supporting the one or more legacy MBMS.

The method 1100 includes adding an identifier in the MBMS interest indication message to identify one of: an absence and a presence of one or more of: (a) at least one of the ROM service field and the list of carriers supporting the supporting the one or more MBMS through the ROM session; and (b) at least one of the legacy service field and the list of carriers supporting the supporting the one or more legacy MBMS.

In some example embodiments, the step of selective transmitting comprises triggering at least one procedure. Accordingly, in some embodiments, the method 1100 includes triggering a procedure for sending the MBMS interest indication message with the ROM service field identifying at least one of the ROM service interest indication and the list of carrier frequencies supporting the supporting the one or more MBMS through the ROM session. In some embodiments, the method 1100 includes triggering a procedure for sending the MBMS interest indication message with the legacy service field identifying at least one of the legacy service interest indication and the list of carrier frequencies supporting the supporting the one or more legacy MBMS. In some embodiment, the method 1100 includes triggering the procedure for sending the MBMS interest indication message with the ROM service field and triggering the procedure for sending the MBMS interest indication message with the legacy service field.

Further, in some example embodiments the method 1100 includes additional steps. Accordingly, the method 1100 includes determining a priority of the one or more MBMS services through the ROM sessions. The priority is determined based on at least one of: a predefined settings, a user-input, one or more services received by the UE, performance measurement of the UE, and optimal performance criteria of the UE. The determined priority indicates one of (a) the UE is not interested in the one or more MBMS through the ROM session; and (b) the UE is interested in the one or more MBMS through the ROM session. At block 1404, the method 1100 includes transmitting information indicative of the determined priority in conjunction with the ROM service interest indication.

Further, in some example embodiments, the step of determining priority comprises additional step. Accordingly, the method 1100 includes determining a priority of one or more legacy MBMS services. The method 1100 includes determining the priority of one or more MBMS services through the ROM sessions relative to the priority of the one or more legacy MBMS services.

Further, in some example embodiments, the step of transmitting at block 1404 includes additional steps. Accordingly, the method 1100 includes adding a ROM service field in a MBMS interest indication message to identify at least one of the ROM service interest indication and a list of carrier frequencies supporting the one or more MBMS through the ROM session. The method 1100 includes extending a priority field in the MBMS interest indication message to indicate the priority of one or more MBMS services through the ROM sessions. The method 1100 includes triggering a procedure for sending the MBMS interest indication message with the ROM service field and the extended priority field.

Further, in some example embodiments, the method 1100 includes additional steps. Accordingly, the method 1100 includes receiving a capability enquiry message from the serving cell in response to transmitting the ROM service interest indication. The method 1100 includes determining a capability of the UE in response to the capability enquiry message. The method 1100 includes transmitting a capability message comprising information about the capability of the UE to the serving cell. The method 1100 includes receiving the one or more MBMS through one of legacy MBMS channel and a unicast channel from the serving cell in response to transmitting the ROM service interest indication.

While specific language has been used to describe the present disclosure, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

We claim:

1. A method for resource capability notification by a user equipment (UE), the method comprising:
determining an event related to a multimedia multicast-broadcast service (MBMS) service in a receive only mode (ROM) session when UE information related to the MBMS service is not broadcasted by a serving cell; and
transmitting an interest indication corresponding to the event to the serving cell, the interest indication including MBMS ROM service information and legacy MBMS service information.

2. The method as claimed in claim 1, wherein the MBMS ROM service information includes at least one of an identity of the MBMS service or an interest of the UE, the interest of the UE indicating one of,
the MBMS service through the ROM session is not of interest to the UE, or
the UE is not in reception of the MBMS service through the ROM session.

3. The method as claimed in claim 1, wherein the transmitting the interest indication corresponding to the event comprises:
adding a ROM service field in a MBMS interest indication message to identify the MBMS ROM service information, the MBMS ROM service information including at least one of a ROM service interest indication or a list of carrier frequencies supporting the MBMS service through the ROM session; and
triggering a procedure for sending the MBMS interest indication message with the ROM service field.

4. The method as claimed in claim 3, wherein the transmitting of the interest indication corresponding to the event comprises:
adding an identifier in the MBMS interest indication message to identify a presence of the ROM service field.

5. The method as claimed in claim 1, wherein
the event indicates one of,
the MBMS service through the ROM session is not of interest to the UE, or
the UE is not in reception of the MBMS service through the ROM session; and
the determining determines the event when the UE information related to the MBMS service is not broadcasted by the serving cell after another interest indication is sent to the serving cell, the other interest indication indicating that the MBMS service is of interest to the UE.

6. The method as claimed in claim 1, further comprising:
determining a legacy MBMS is of interest to the UE,
wherein the transmitting transmits the legacy MBMS service information with the interest indication corresponding to the event in response to determining the legacy MBMS is of interest to the UE, the legacy MBMS service information including a legacy service interest indication indicating the legacy MBMS is of interest to the UE.

7. The method as claimed in claim 6, wherein the transmitting comprises at least one of:
adding a ROM service field in a MBMS interest indication message, the ROM service field including the MBMS ROM service information, and the MBMS ROM service information identifying at least one of a ROM service interest indication or a list of carrier frequencies supporting the MBMS service through the ROM session; or
adding a legacy service field in the MBMS interest indication message, the legacy service field including the legacy MBMS service information, and the legacy MBMS service information identifying at least one of the legacy service interest indication or a list of carrier frequencies supporting the legacy MBMS.

8. The method as claimed in claim 7, wherein the transmitting comprises:
adding an identifier in the MBMS interest indication message, the identifier identifying an absence or a presence of one or more of:
the ROM service field; or
the legacy service field.

9. The method as claimed in claim 8, wherein the transmitting comprises at last one of:
triggering a procedure for sending the MBMS interest indication message with the ROM service field; or
triggering a procedure for sending the MBMS interest indication message with the legacy service field.

10. The method as claimed in claim 1, further comprising:
determining a priority of the MBMS service; and
transmitting information indicative of the priority in conjunction with the interest indication corresponding to the event.

11. The method as claimed in claim 10, wherein the determining the priority comprises:
determining the priority based on at least one of: a setting, a user-input, one or more services received by the UE, a performance measurement of the UE, or a performance criteria of the UE.

12. The method as claimed in claim 11, wherein the priority indicates one of:
the MBMS through the ROM session is not of interest to the UE; or
the MBMS through the ROM session is of interest to the UE.

13. The method as claimed in claim 10, further comprising:
determining a priority of one or more legacy MBMS services; and
determining the priority of the MBMS service relative to the priority of the one or more legacy MBMS services.

14. The method as claimed in claim 10, wherein the transmitting the interest indication corresponding to the event comprises:
adding a ROM service field in a MBMS interest indication message including the MBMS ROM service information, the MBMS ROM service information identifying at least one of a ROM service interest indication or a list of carrier frequencies supporting the MBMS service through the ROM session;
extending a priority field in the MBMS interest indication message to indicate the priority; and
triggering a procedure for sending the MBMS interest indication message with the ROM service field and the priority field.

15. The method as claimed in claim 1, further comprising:
determining the event related to the MBMS service when the UE is in reception of at least one MBMS in the ROM session or the UE is not in reception of the MBMS service through the ROM session.

16. The method as claimed in claim 1, further comprising:

receiving a capability enquiry message from the serving cell in response to transmitting the interest indication corresponding to the event;

determining a capability of the UE in response to the capability enquiry message; and transmitting a capability message to the serving cell, the capability message including information about the capability.

17. The method as claimed in claim 16, further comprising:

receiving the MBMS service through one of a legacy MBMS channel or a unicast channel from the serving cell in response to transmitting the interest indication corresponding to the event.

18. A device for resource capability notification, comprising:

at least one processor configured to, transmit an interest indication to a serving cell, the interest indication being for a multimedia multicast-broadcast service (MBMS) service or corresponding to an event, the event being related to the MBMS service in a receive only mode (ROM) session, and the interest indication including MBMS ROM service information and legacy MBMS service information, determine whether UE information related to the MBMS service is broadcasted by the serving cell, and determine the event related to the MBMS service in the ROM session in response to determining the UE information is not broadcasted by the serving cell.

19. A device for resource capability notification, comprising:

a memory storing instructions; and at least one processor configured to execute the instructions to:

determine an event related to a multimedia multicast-broadcast service (MBMS) service in a receive only mode (ROM) session when UE information related to the MBMS service is not broadcasted by a serving cell, and transmit an interest indication corresponding to the event to the serving cell, the interest indication including MBMS ROM service information and legacy MBMS service information.

20. A non-transitory computer-readable storage medium, on which a computer program is stored, which, when executed by a processor, causes the processor to carry out the method according to claim 1.

* * * * *